United States Patent
Vikberg et al.

(10) Patent No.: US 8,284,701 B2
(45) Date of Patent: Oct. 9, 2012

(54) RESPONSE TO CS PAGING REQUEST

(75) Inventors: Jari Tapio Vikberg, Järna (SE); Magnus Hallenstål, Täby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 281 days.

(21) Appl. No.: 12/666,017

(22) PCT Filed: Jun. 22, 2007

(86) PCT No.: PCT/EP2007/056269
§ 371 (c)(1),
(2), (4) Date: Mar. 26, 2010

(87) PCT Pub. No.: WO2009/000315
PCT Pub. Date: Dec. 31, 2008

(65) Prior Publication Data
US 2010/0208624 A1    Aug. 19, 2010

(51) Int. Cl.
*H04L 12/16* (2006.01)
*H04Q 11/00* (2006.01)

(52) U.S. Cl. ........ 370/259; 370/276; 370/277; 370/351; 370/352; 455/426.1; 379/56.1; 340/426.21

(58) Field of Classification Search .......... None
See application file for complete search history.

(56) References Cited

U.S. PATENT DOCUMENTS

| | | | |
|---|---|---|---|
| 6,788,673 B1 * | 9/2004 | Koskinen | 370/352 |
| 7,924,811 B2 * | 4/2011 | Asokan | 370/352 |
| 7,945,273 B2 * | 5/2011 | Flint | 455/458 |
| 2004/0184439 A1 | 9/2004 | Blanc | |
| 2006/0176872 A1 * | 8/2006 | Serna et al. | 370/351 |

FOREIGN PATENT DOCUMENTS

| | | |
|---|---|---|
| EP | 1081971 A | 3/2001 |
| GB | 2419258 A | 4/2006 |

OTHER PUBLICATIONS

"Digital cellular telecommunications system (Phase 2+): Universal Mobile Telecommunications System (UMTS): General Packet Radio Service (GPRS); Service description; Stage 2 (3GPP TS 23.060 version 7.4.0 Release 7); ETSI TS 123 060" ETSI Standards, LIS, vol. 3-SA2, No. V7.4.0, Mar. 1, 2007. XP014037710 ISSN: 0000-0001 Sections 6.3 and 6.13 Sections 6.12 and 9.2.2.

* cited by examiner

*Primary Examiner* — Ayaz Sheikh
*Assistant Examiner* — Blanche Wong

(57) ABSTRACT

A method and apparatus are provided for handling a paging request for a Circuit Switched session, when the paging request is intended for a terminal attached to a Packet Switched cell in a radio access network and having one or more ongoing Packet Switched sessions. The request is received at a node in the radio access or core network to establish a Circuit Switched session with the terminal while the terminal has one or more ongoing Packet Switched sessions. The importance of the ongoing Packet Switched session is determined at the node, and the paging request is rejected if any of the ongoing Packet Switched sessions is more important than the Circuit Switched session. The node may be a MME, an eNodeB or the terminal itself.

20 Claims, 8 Drawing Sheets

RESPONSE TO CS PAGING REQUEST

TECHNICAL FIELD

The invention relates to the provision of a response to a Circuit Switched paging request received by a terminal attached to a Packet Switched bearer in a radio access network.

BACKGROUND

Mobile Circuit Switched (CS) services based on Global System for Mobile Communications (GSM) and Wideband Code Division Multiple Access (WCDMA) radio access are used world-wide. They allow a user to obtain telecommunication services with a single user subscription in most countries of the world. The number of CS subscribers is growing rapidly, boosted by the roll-out of mobile CS services in countries with high populations such as India and China. One reason the number of subscribers is still growing rapidly is the evolution of the Mobile Switching Centre (MSC) architecture into a softswitch solution, which allows the use of a Packet Switched (PS) transport infrastructure for mobile CS services.

A 3GPP work item, "Evolved UTRA and UTRAN", defines a Long-Term Evolution (LTE), designed to improve efficiency, lower costs and improve services for 3GPP-based access technology. LTE will use Orthogonal Frequency-Division Multiplexing (OFDM) radio technology in the downlink and Single Carrier Frequency Division Multiple Access (SC-FDMA) for the uplink, allowing at least 100 Mbps peak data rate for downlink data rate and 50 Mbps for uplink data rate. LTE radio can operate in different frequency bands and is therefore very flexible for deployment in different regions of the world, where different frequency bands might be licensed.

In addition to the Radio Access Network (RAN) standardization, a 3GPP System Architecture Evolution (SAE) work item is being to develop an evolved core network for LTE radio access networks. This new core network is also called Evolved Packet Core (EPC). The nodes and interfaces of the SAE core network and LTE radio access networks are illustrated schematically in FIG. 1. The SAE core network (SAE CN) is made up of core nodes, which may be further split into Control Plane (Mobility Management Entity, MME) nodes 1 and User Plane Gateway (Serving Gateway and PDN Gateway) nodes 2. In this application, the term Access Gateway (AGW) is used to depict both the Serving Gateway and the PDN Gateway nodes and functions. In the terminology currently used, AGW contains both User Plane Entity (UPE) and Inter-Access Anchor (IASA) functionality. The MME 1 is connected to an E-UTRAN Node B (eNodeB) 3 via a S1-MME interface, and the AGW 2 (i.e. the Serving Gateway) is connected to an eNodeB 3 via an S1-U interface.

LTE and SAE only support PS data transport, and so all services must be supported via a PS domain. However, existing GSM (GPRS) and WCDMA each provide for both PS and CS access and services, and so for telephony services to be deployed over LTE radio access, an IMS-based service engine is required. Solutions to allow LTE/SAE access to CS domain services normally available via GSM and WCDMA radio accesses are referred to as "CS over LTE/SAE", or briefly just "CS over LTE" (CSoLTE) solutions. The basic architecture for these solutions is illustrated schematically in FIG. 2. It will be appreciated that references to "Circuit Switched services" throughout this document are intended to refer to the type of services traditionally available in the CS domain, however they are implemented.

The Packet MSC (PMSC) 4 may serve both traditional GSM and UMTS RANs 5 and the new CS over LTE based solutions 6. The PMSC 4 contains two logical functions referred to as a Packet CS Controller (PCSC) 7 and an Interworking Unit (IWU) 8, which are further illustrated in FIG. 3.

The communication between a terminal (MS) 10 accessing a network and the PMSC 4 is based on the standard Gi interface which is also called as a SGi interface in the SAE terminology. This means that all direct communication between the terminal 10 and the PCSC 7 and the IWU 8 in the PMSC 4 is based on IP protocols. The terminal 10 is visible and reachable using an IP-address via an Access Gateway (AGW) 2. This communication is via two different interfaces, U8c for the control plane and U8u for the user plane. The PCSC 7 has also an Rx interface to the Policy Control and Charging Rules Function (PCRF) for allocation of LTE/SAE bearers.

Different solutions for providing CSoLTE service have been identified. One solution is referred to as "CS Fallback". In CS Fallback, the terminal performs SAE Mobility Management (MM) procedures towards a Mobility Management Entity (MME) 1 while using LTE access. The MME 1 registers the terminal in a Mobile Switching Centre Server (MSC-S) 9 for CS based services. When a mobile terminating call or other transaction request resulting in a page for CS services is received in the MSC-S 9 it is forwarded to the terminal as a CS Paging request via the MME 1 and then the terminal performs fallback to a GSM or UMTS RAN and responds to the CS Paging Request. This means that the terminal selects a cell in a GMS RAN (GERAN) or in a UMTS RAN (UTRAN) based on information received e.g. as part of the SAE MM procedures. A similar process is used for Mobile originated CS services, and when these are triggered and the terminal is using LTE access, it will fallback to a GSM or UMTS RAN and trigger the initiation of the CS service there.

Another solution is referred to as "CS over LTE Integrated" (CSoLTE-I). In this solution the same SAE MM and paging procedures as for "CS Fallback" are used, but instead of performing fallback to a GMS or UMTS RAN, the terminal performs all the CS services over the LTE access network. CS services (also called Connection Management, CM, procedures) are transported over IP-based protocols between a PMSC 4 and the terminal using the LTE access network and SAE nodes such as the AGW 2.

A further solution is referred to as "CS over LTE Decoupled" (CSoLTE-D). In this solution both MM and CM procedures are transported using IP-based protocols directly between the PMSC 4 and the terminal using the LTE radio access network and SAE user plane nodes such as the AGW 2.

The CSoLTE control plane protocol architecture between the terminal (MS) 10 and the PMSC 4 (i.e. the U8c interface) is illustrated schematically in FIG. 4. Interposed between the two are the eNodeB and the AGW. This architecture is based on IP protocols (IP, TCP, UDP) and an additional tunnelling protocol named as U8-Circuit Switched Resources (U8-CSR) which may for example be based on Generic Access Network (GAN) tunnelling protocols. This protocol carries the Mobility Management (MM) and all the protocol layers above MM transparently between the terminal and the PMSC 4. The U8c interface applies only for the CSoLTE-I and CSoLTE-D solutions.

The CSoLTE user plane protocols between the terminal and the PMSC 4 (i.e. the U8u interface) are illustrated in FIG. 5. eNodeB 3 and AGW 2 are arranged between the two. This architecture is based on IP protocols (IP, UDP, RTP) that are used to transmit the necessary voice and data communication (e.g. AMR coded voice) between the terminal 10 and the PMSC 4. The U8*u* interface is only used in the CSoLTE-I and CSoLTE-D solutions.

FIG. 6 illustrates current working assumptions for the fallback mechanism in the "CS Fallback" solution described above. The terminal (UE) 10 performs the fallback (i.e. selection of GSM or UMTS RAN and cell) based on information received during a Location Area/Tracking Area Update.

FIG. 6 also illustrates the signalling used to handle paging in the CS Fallback solution. A CS Paging Request is used to set up a signalling connection between the terminal 10 and the network (MSC/VLR 11). This signalling connection can then be used for different purposes, e.g. establishment of a mobile terminated call or delivery of a mobile terminated SMS from the network to the terminal. In a circuit-switched part of the GSM network, the location of the terminal 10 is maintained on Location Area (LA) level when the terminal is in so called idle mode and the current Location Area Identifier (LAI) is maintained at a Mobile Switching Centre 11 (MSC) or Visitor Location Register (VLR), and the terminal is then paged on that Location Area. When the MME 1 and eNodeB 3 receive the CS paging request, it is unconditionally forwarded to the terminal 10. Similarly, when the terminal 10 receives the CS paging request, it unconditionally tries to respond to it. This means that the terminal leaves the current LTE cell and performs fallback to a GSM or UMTS RAN and responds to the CS Paging Request in the GSM or UMTS RAN. The fallback to GSM or UMTS RAN means that the terminal selects a cell in a GSM RAN (GERAN) or in a UMTS RAN (UTRAN) based on information received e.g. as part of the SAE MM procedures.

A problem with the signalling illustrated in FIG. 6, is that the terminal 10 may already be using PS bearer services, for example VoIP, Mobile TV or some other real-time streaming services when the CS paging request is received. It is not possible for the MME 1 or eNodeB 3 to know if they should prioritise these current PS-bearers or the CS page request, since they are not service aware. This can be problematic if the PS bearers or services are considered to be important either for the operator or for the end user.

Currently it does not exist any function in the terminal 10 which allows it or the user to reject the CS paging request and to prioritise the current PS-bearers and services. This is, again, problematic if the PS bearers or services are considered by the end user to be important.

SUMMARY

In accordance with one aspect of the present invention there is provided a method of handling a paging request to establish a Circuit Switched session with a terminal in a mobile communications network (preferably comprising radio access network and core network portions) when the terminal has one or more ongoing Packet Switched sessions. The paging request is received at a node either in the core network (e.g. MME) or in the radio access network (e.g. eNodeB). The importance of the ongoing Packet Switched session is determined at the node. If any of the ongoing Packet Switched sessions is more important than the Circuit Switched session, the paging request is rejected.

The rejection of the paging request may include discarding the paging request without sending a response. Alternatively, a negative paging response message may be sent from the node to the initiator of the paging request. The negative paging response may include details of the reasons for the rejection of the paging request.

The terminal is preferably attached to a Packet Switched cell of the radio access network, which is preferably an LTE radio access network. In one embodiment the ongoing Packet Switched session is a LTE Packet Switched session. In another embodiment the ongoing Packet Switched session is any Universal Mobile Telecommunications System (UMTS) with or without High-Speed Packet Access (HSPA) Packet Switched session or a General Packet Radio Service (GPRS) Packet Switched session.

Preferably, if the paging request is not rejected, a target cell is selected from a plurality of candidate cells to which the terminal may attach, the target cell being able to handle a Circuit Switched session. A Packet Switched handover may then be performed to the selected cell, and the Circuit Switched session may then be handled in the selected cell. The terminal itself may select and attach itself to the target cell.

The node may comprise an eNodeB in a Long Term Evolution network. If this is the case, the paging request may be forwarded from the node to the terminal if the ongoing Packet Switched session is less important than the Circuit Switched session. Alternatively, the node may comprise the MME in a SAE core network or in Evolved Packet Core (EPC) network. The node may also comprise a SGSN in a UMTS or GSM network or a Base Station Controller (BSC) in GERAN or Radio Network Controller (RNC) in UTRAN.

Alternatively, the node may comprise the terminal itself. In this case, the terminal may choose to prioritize the received CS paging request over the current PS sessions and leave these PS sessions and move to e.g. the GSM or UMTS RAN and a positive page response may be sent from the terminal in the GSM or UMTS RAN if the ongoing Packet Switched session is less important than the Circuit Switched session.

In either case, the step of determining the importance of the ongoing Packet Switched sessions preferably includes comparing the ongoing Packet Switched sessions with preconfigured information identifying Packet Switched sessions deemed to be more important than Circuit Switched sessions. When the node comprises the terminal, this preconfigured information may be provided by the user of the terminal. Alternatively, the Packet Data Protocol (PDP) context may be examined for a priority class identifying whether the ongoing Packet Switched session is more important than the Circuit Switched session. Each PDP context may be marked with a priority class indicating if it is more important than a certain CS Tele Service. The classification in the preferred embodiment will come from the PCRF when ordering establishment of a PDP context.

When the node is the terminal, the user may be given the option of accepting the Circuit Switched session. Thus the step of determining the importance of the ongoing Packet Switched session may include identifying to the user that the paging request has been received, enabling the user to indicate whether the ongoing Packet Switched session is more important than the Circuit Switched session. To assist the user with his decision, the originator of the session that caused the CS paging request may also be identified. The user may also be informed of the type of CS Tele Service (e.g. voice call, SMS message, fax etc.) that triggered the CS paging. A predetermined action (e.g. to reject the paging request) may be taken by the terminal if no indication is received from the user within a predetermined time.

The core network is preferably handled by a Mobile Switching Centre (MSC) or by a Serving GPRS Support Node (SGSN) in a Global System for Mobile (GSM) Communications network or Wideband Code Division Multiple Access (WCDMA) network that sent the request to establish a Circuit Switched session with the terminal.

In accordance with another aspect of the present invention there is provided a node for use in a SAE or EPC network. The node comprises:
- a receiver for receiving a request to establish a Circuit Switched session with a terminal, the terminal being attached to the node and having one or more ongoing Packet Switched sessions;
- a processor for determining whether the ongoing Packet Switched sessions are more important than the Circuit Switched session; and
- means for forwarding the request to the terminal if the ongoing Packet Switched sessions are not more important than the Circuit Switched session.

In accordance with another aspect of the present invention there is provided a node for use in a Long Term Evolution network. The node comprises:
- a receiver for receiving a request to establish a Circuit Switched session with a terminal, the terminal being attached to the node and having one or more ongoing Packet Switched sessions;
- a processor for determining whether the ongoing Packet Switched sessions are more important than the Circuit Switched session; and
- means for forwarding the request to the terminal if the ongoing Packet Switched sessions are not more important than the Circuit Switched session.

Thus in order to reduce the problem of CS calls supplanting high priority PS traffic, the MME, eNodeB or terminal apply logic, based on the PS bearers currently in use by the terminal, to conditionally reject the CS paging request—i.e. to take no action, or send a negative response, in response to the CS paging request.

DETAILED DESCRIPTION

With reference first to FIGS. 1 to 6, a user terminal (UE) 10 is assumed to be attached to a cell of a radio access network (RAN) and the RAN is further controlled by a core network (CN). The RAN is an LTE RAN that comprises an eNodeB 3 and the CN is a SAE/EPC CN that comprises a Mobility Management Entity (MME) 1. The user terminal is in an LTE_ACTIVE state and has one or more ongoing PS sessions.

If an MSC/VLR 11 wishes to initiate a new CS call to the terminal 10, it directs a CS Paging Request towards the terminal 10. The request is sent to an eNodeB 3 via a MME 1.

Figure 1:
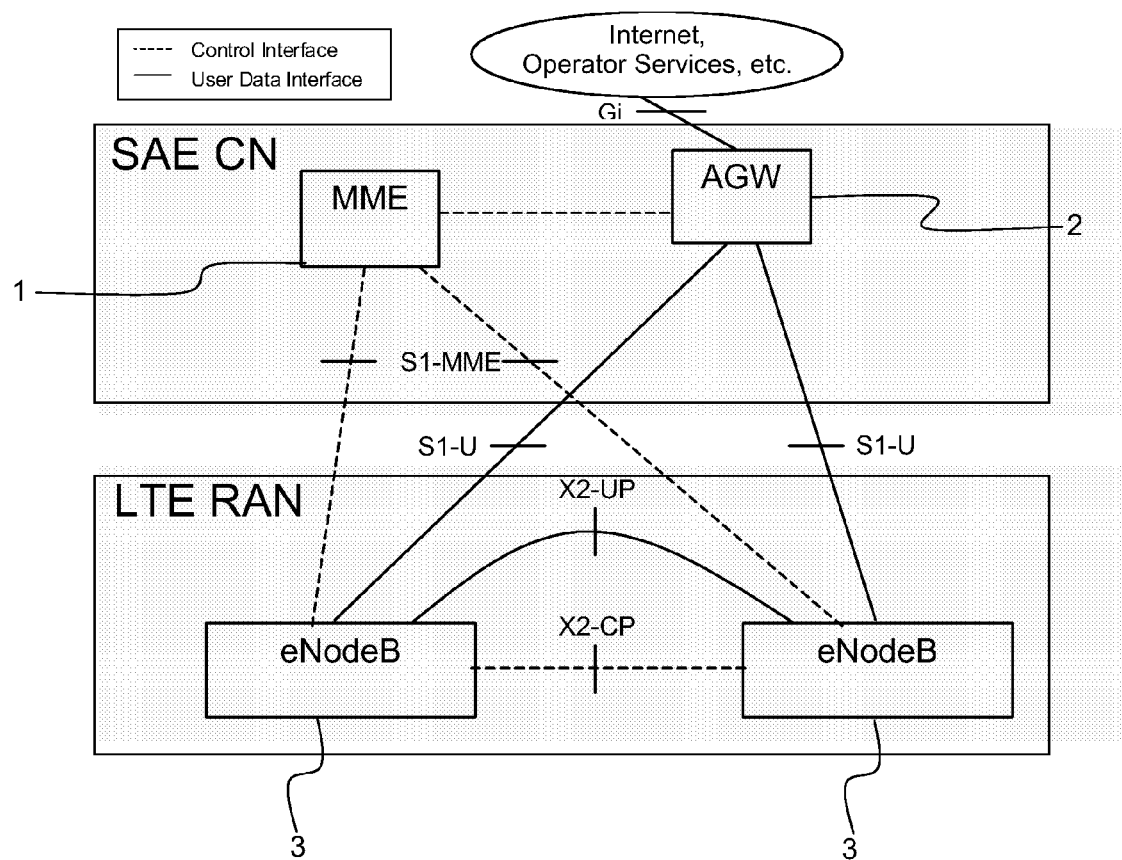
FIG. 1 illustrates schematically the nodes and interfaces of the SAE core network and LTE radio access network.
Figure 2:
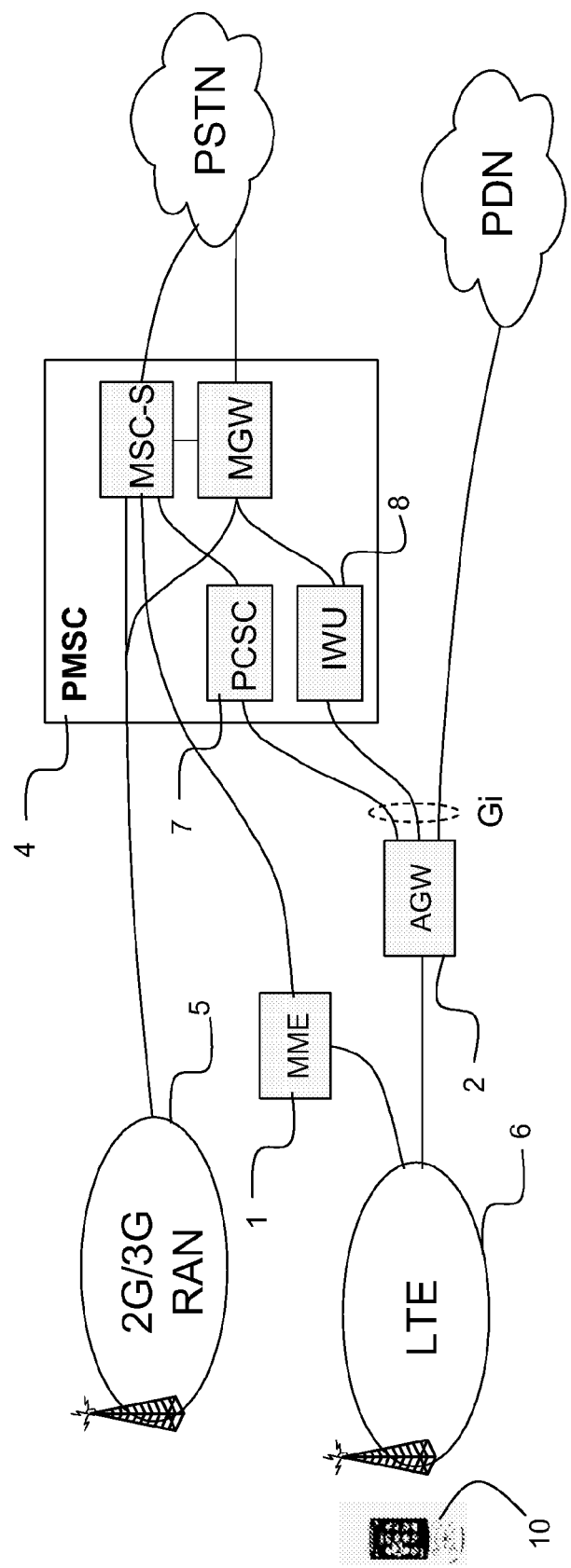
FIG. 2 illustrates schematically CS over LTE architecture.
Figure 3:
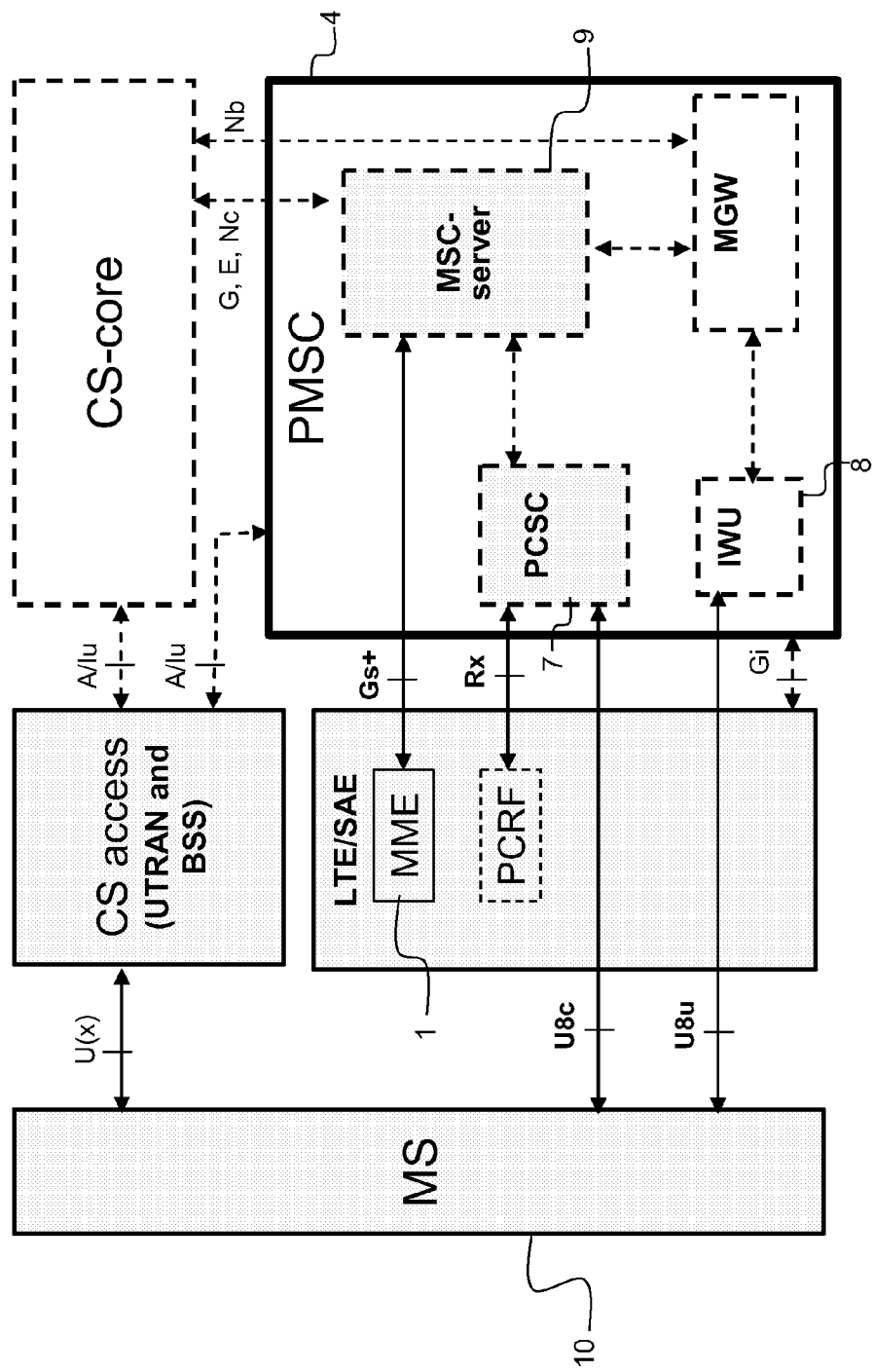
FIG. 3 illustrates schematically CS over LTE reference architecture.
Figure 4:
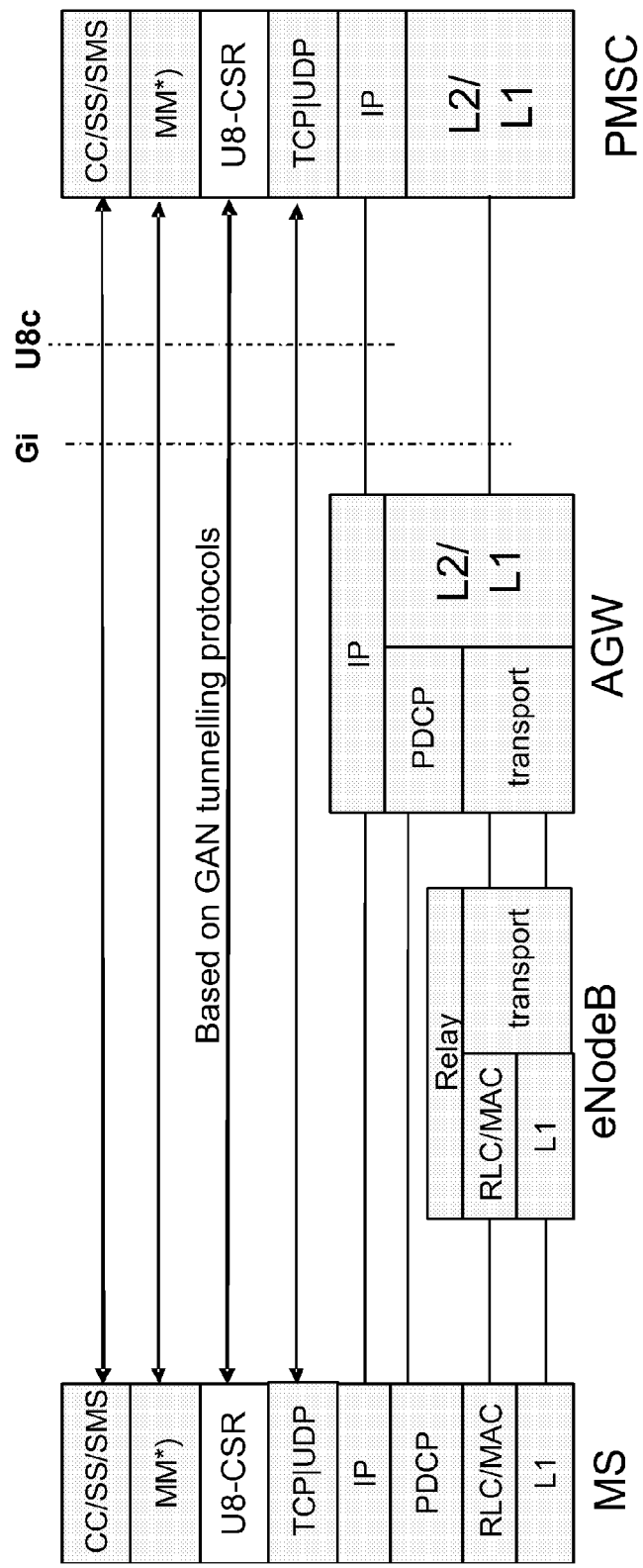
FIG. 4 illustrates schematically CS over LTE control plane protocol architecture.
Figure 5:
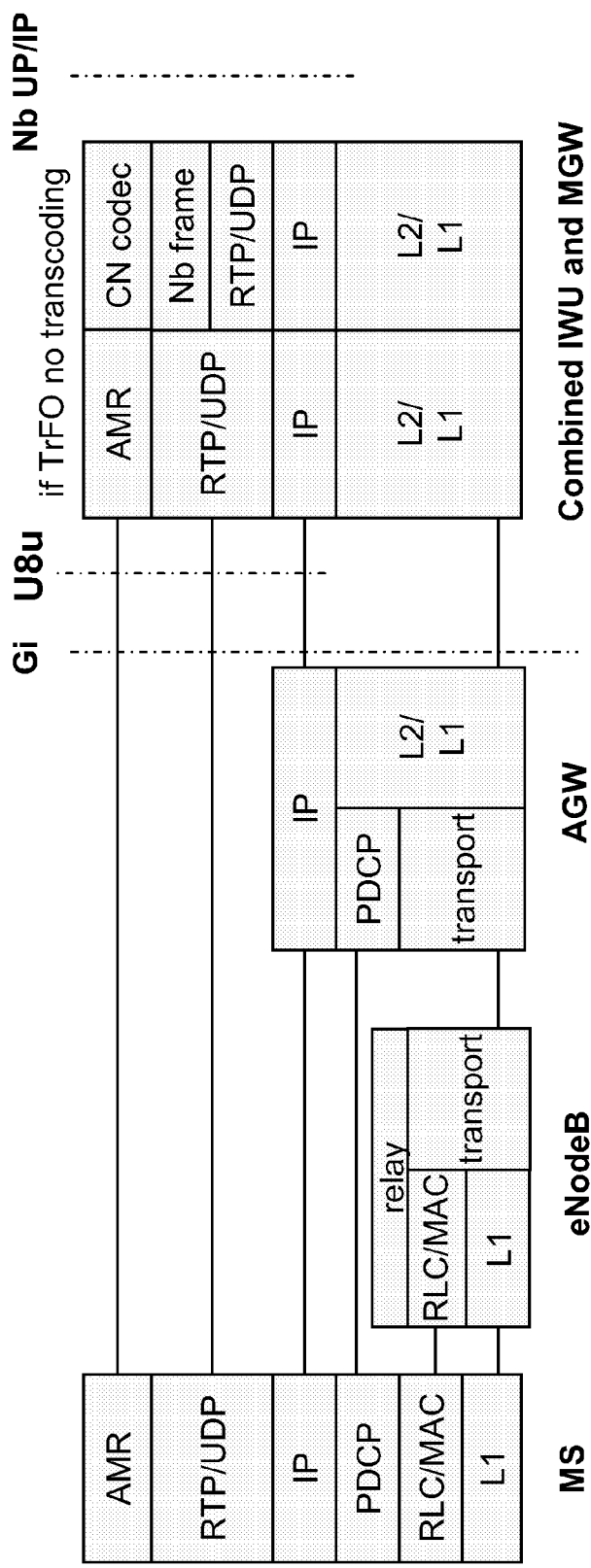
FIG. 5 illustrates schematically CS over LTE user plane protocol architecture.
Figure 6:
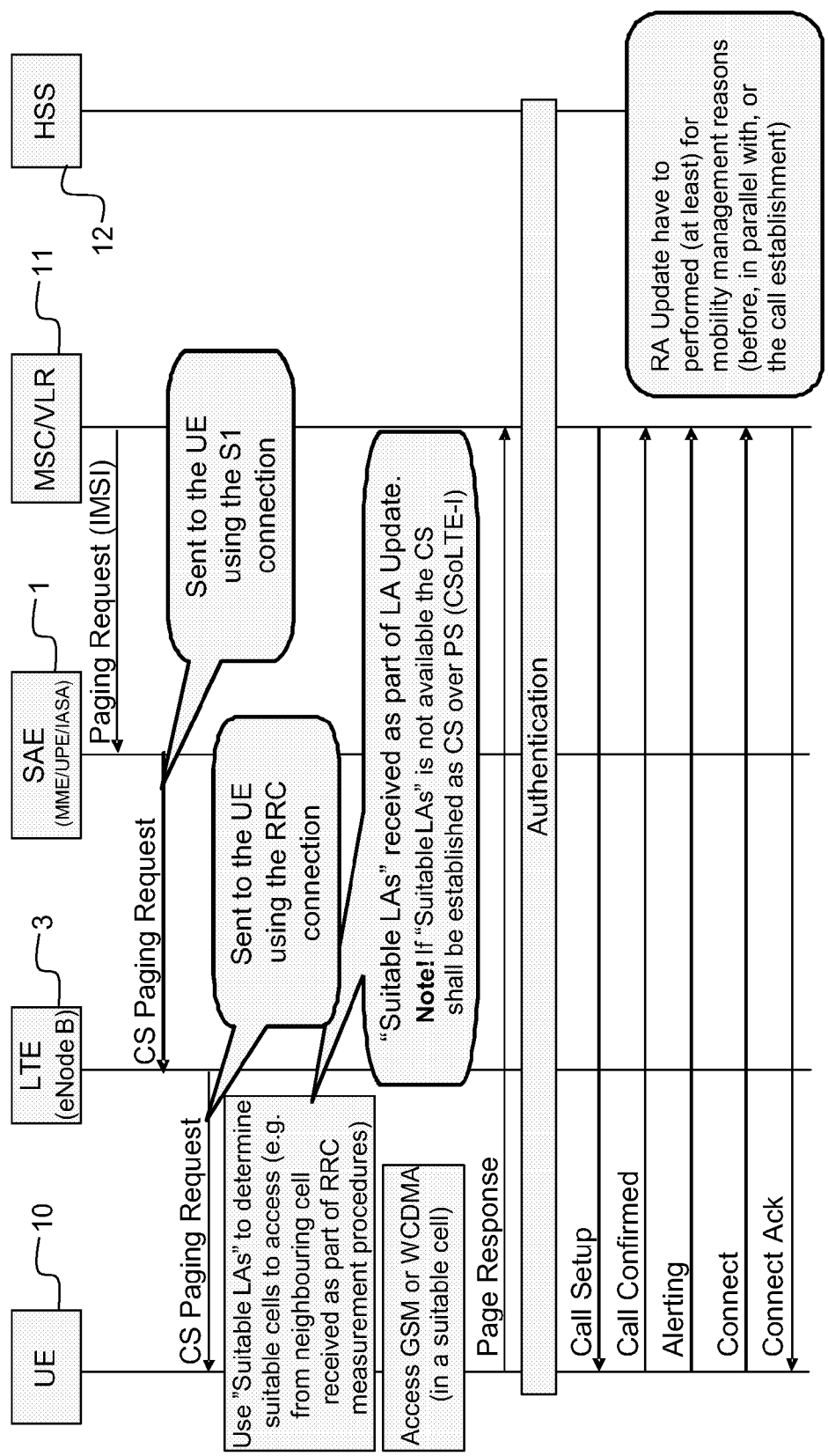
FIG. 6 is a signalling diagram illustrating one example of the CS fallback mechanism.
Figure 7:
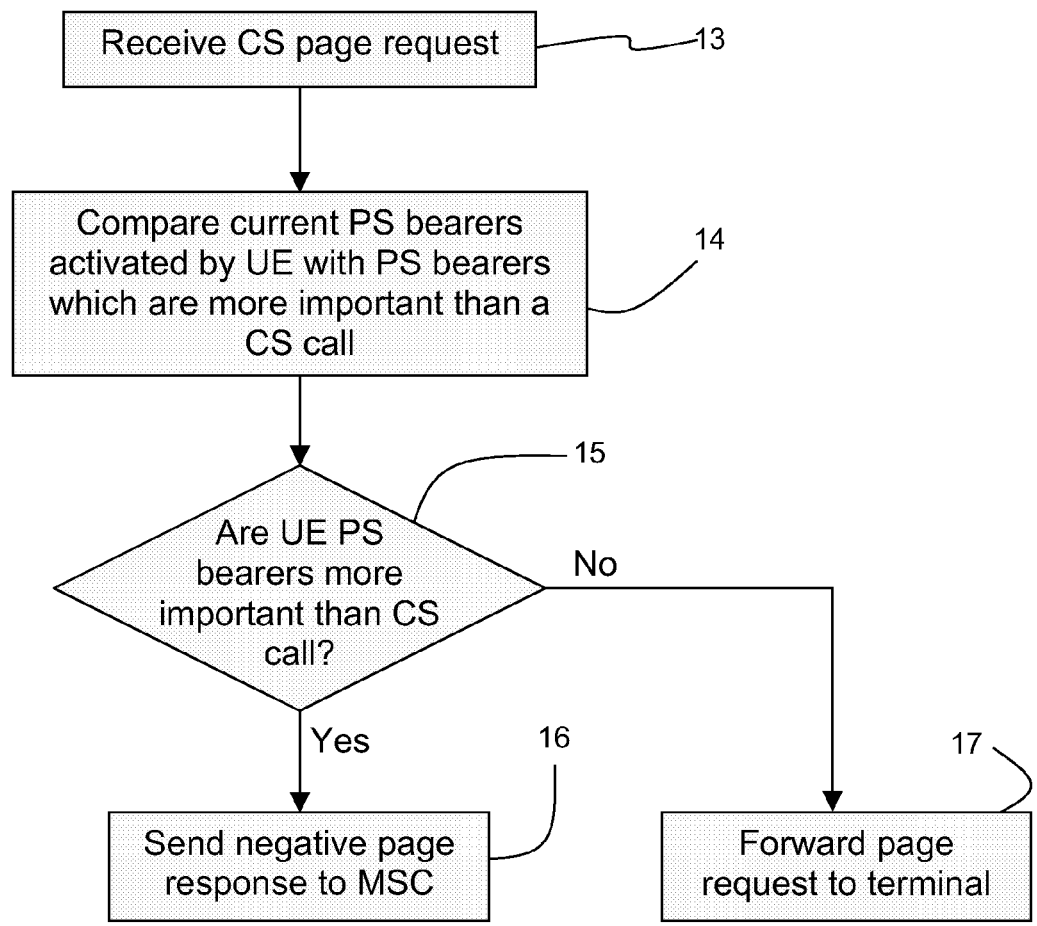
FIG. 7 is a flow diagram illustrating the response of an eNodeB to a CS paging request according to an embodiment of the present invention.

FIG. 7 is a flow diagram illustrating the procedure to be followed when a CS paging request is received either at the eNodeB 3 or at the MME 1. When the eNodeB 3 (or MME 1) receives the CS Paging Request 13 to establish a CS session with the terminal 10, it analyses the information 14 it holds about PS bearer services currently being used by the terminal 10. The eNodeB (or MME 1) also holds preconfigured information about PS bearer services which are more important than a CS session. The preconfigured information may contain a classification value for each CS Tele Service. This can be used if the CS paging request contains information of the CS Tele Service. If the eNodeB 3 (or MME 1) establishes that the PS bearer services operated by the terminal 10 are more important than a CS session 15, the CS Paging Request message is silently discarded.

Alternatively, a negative Paging Response message 16 is sent back to the MSC 11 to inform the calling party that the call attempt has been unsuccessful. The cause of the rejection may also be included in the paging response message.

As an alternative, instead of having preconfigured information in the Node, each PDP context may be marked with a priority class indicating if it is more important than a certain CS Tele Service. The classification in the preferred embodiment will come from the PCRF when ordering establishment of a PDP context. The classification is included in all the Bearer request signalling towards all the nodes, e.g. eNodeB, MME, terminal.

If the PS bearer services operated by the terminal 10 are not more important than a CS session, the CS page request is forwarded 17 to the terminal 10.

It will be appreciated that some CS sessions may be seen as more important than others. For example, a voice call is likely to be more important than a fax or SMS message.

The CS paging request should identify the type of session (i.e. CS Tele Service) to which it relates, and the eNodeB 3 or MME 1 may therefore allocate many PS bearer services as being less important than a voice call, but only a few PS bearer services as being less important than a fax.

Figure 8:
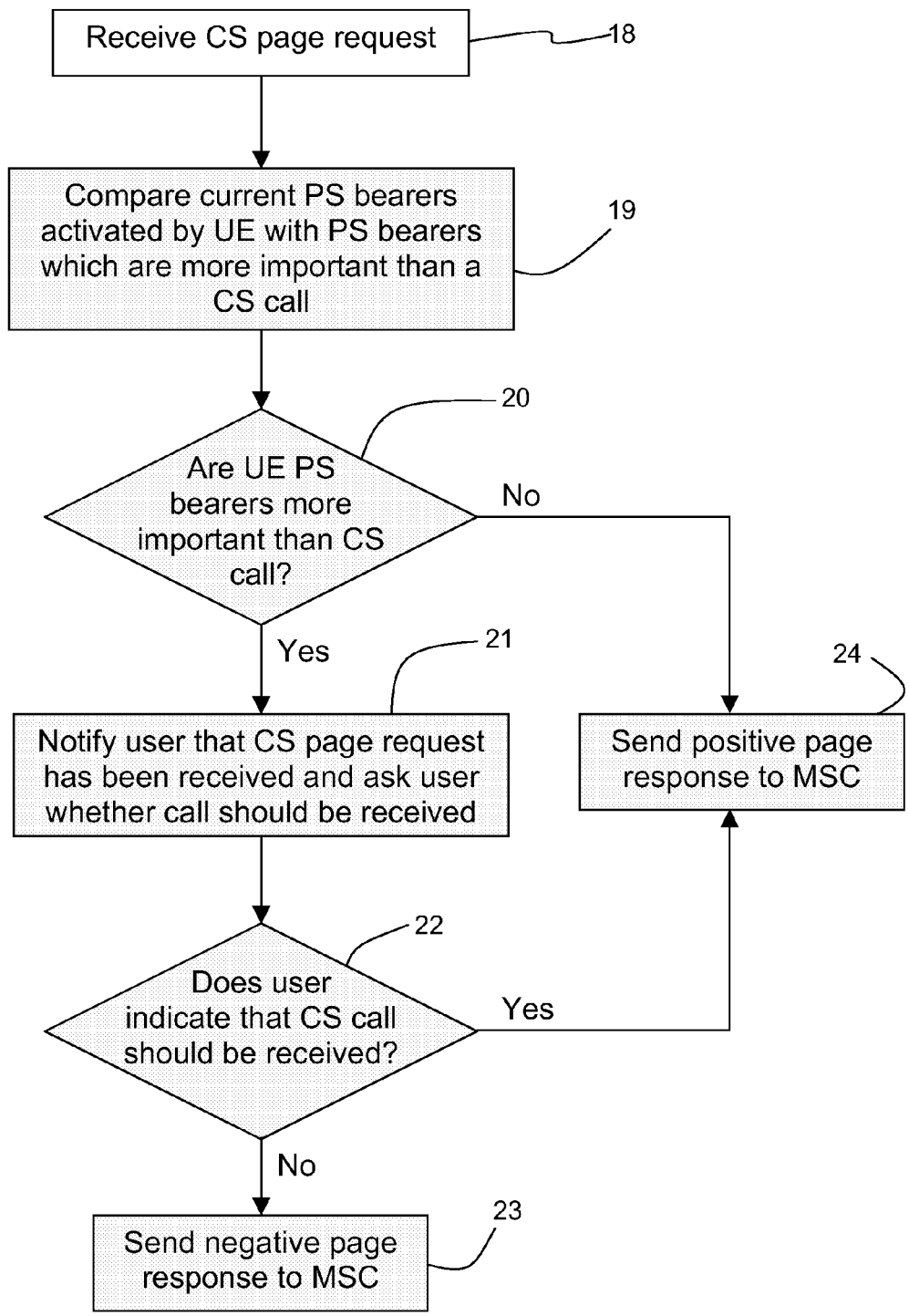
FIG. 8 is a flow diagram illustrating the response of a terminal to a CS paging request according to an embodiment of the present invention.

As a further alternative (or in addition) to the analysis performed by the eNodeB 3 (or by the MME 1), further analysis may be carried out by the terminal 10. FIG. 8 is a flow diagram illustrating the procedure to be followed when a CS paging request is received at the terminal 10. When the terminal 10 receives the CS Paging Request 18, it compares 19 the information it holds regarding which PS services or bearers are currently activated with preconfigured information about PS services or bearers that are more important than a CS session. As an alternative, again, each PDP context may be marked with a priority class to enable the terminal to identify whether the CS session is more important than the PS services or bearers. In one embodiment no response to the CS paging request is sent if the currently activated PS services or bearers are more important than the CS session 20.

Alternatively, an indication may be made to the user 21 that a CS paging request has been received, allowing the user to decide whether or not to act on the request. This may take the form of a question such as "You are being paged for a CS call. Proceed and stall the current PS-bearers?" displayed to the end user. This question should be displayed for a limited time only (if displayed at all), after which a default action will be taken so that, if the call is to be terminated, the MSC 11 does not maintain the CS call for any longer than necessary. The default action would preferably have been pre-configured by the user or the operator.

For example, if the terminal 10 identifies an incoming CS page request, but establishes that the terminal is operating important PS bearer services, the user may be given five seconds to respond to the CS page request. If the user does not respond in five seconds, the terminal 10 rejects the request. Of course, the default action may have been configured by the user to respond to the CS page request after a predetermined time. It may also assist the user in making a decision whether or not to proceed if the originator of the CS page request is identified to him. In addition, he may be informed of the type of session for which the CS page request has been received. For example, he might choose to receive a CS voice call instead of the PS bearer services currently being operated, but might choose not to receive an SMS message or a fax. Again, such information could have been configured into the default action, so that a response is automatically sent to particular originators of CS sessions.

As with the eNodeB 3, if PS services or bearers identified as important are active 20, or if the user rejects the CS Page 22, in one embodiment the CS Paging Request message is silently discarded. Alternatively, a negative Paging Response message 23 is sent back to the network that initiated the CS Paging Request message to inform the calling party that the call attempt has been unsuccessful. The cause of the rejection may also be included in the paging response message.

If the PS bearers currently used by the terminal 10 are not more important than the CS session, or if the user indicates that the CS call should be received 22, the terminal may choose to prioritize the received CS paging request over the current PS sessions and leave these PS sessions and move to e.g. the GSM or UMTS RAN 5. A positive page response 24 is then sent to the MSC 11.

Figure 9:
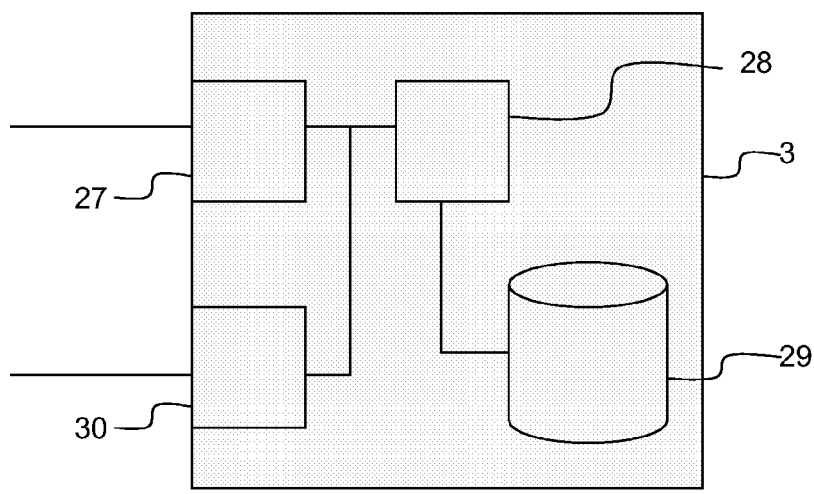
FIG. 9 illustrates schematically a node for use in a LTE radio access network or SAE core network according to an embodiment of the invention.

Referring to FIG. 9, there is illustrated an eNodeB 3 for use in a Long Term Evolution network. The eNodeB 3 is provided with a receiver 27 for receiving a request to establish a CS Page request, and a processor 28 for determining whether the PS bearers currently operated by a terminal preclude the acceptance of the CS Page request. A memory 29 may also be provided, and a transmitter 30 is provided to send the CS paging request to the terminal 10.

It will be appreciated that the present invention has been conceived to deal with the situation in which the cell or Radio Access Network (RAN), in which a response to a CS page request must be generated, does not support simultaneous CS and PS bearer services. An example of this situation arises in GSM without support for Dual Transfer Mode (DTM). The invention is also particularly applicable to the situation in which supported PS bearers have much worse capacity than the currently used PS bearer and there is a need to perform "CS Fallback" to the RAN or cell with worse support of PS bearers.

However, it will be further appreciated that the invention could also be extended to a standard GSM/GPRS network. In this case, the decision as to whether a CS page request should be responded to could be made either in the SGSN or Base Station Controller (BSC) (i.e. instead of the MME and eNodeB described above), or in the terminal (UE) as described above. It will also be further appreciated that the invention could also be extended to a standard UMTS/WCDMA network. In this case, the decision as to whether a CS page request should be responded to could be made either in the SGSN or Radio Network Controller (RNC) (i.e. instead of the MME and eNodeB described above), or in the terminal (UE) as described above.

The invention ensures that PS sessions can be prioritised over CS calls, either in the network or at the terminal.

It will be appreciated by the person of skill in the art that various modifications may be made to the above described embodiments without departing from the scope of the present invention.

The invention claimed is:

1. A method of handling a paging request to establish a Circuit Switched session with a terminal in a radio access network of a mobile communications network, the terminal having one or more ongoing Packet Switched sessions, the method comprising:
   receiving the paging request at the terminal, the paging request including an indication of an originator of the Circuit Switched session that caused the paging request;
   determining a priority of the one or more ongoing Packet Switched sessions by identifying to a user of the terminal that the paging request has been received and the originator of the Circuit Switched session that caused the paging request, and enabling the user to indicate whether the one or more ongoing Packet Switched sessions have a higher priority than the Circuit Switched session; and
   if any of the one or more ongoing Packet Switched sessions have a higher priority than the Circuit Switched session, rejecting the paging request.

2. The method of claim 1, wherein a rejection of the paging request includes discarding the paging request without sending a response.

3. The method of claim 1, wherein the rejection of the paging request includes sending a negative paging response message from a node to an initiator of the paging request.

4. The method of claim 3, wherein the negative paging response includes details of reasons for the rejection of the paging request.

5. The method of claim 1, wherein the terminal is attached to a Packet Switched cell of the radio access network.

6. The method of claim 5, wherein the radio access network is a Long Term Evolution radio access network.

7. The method of claim 5, further comprising:
   if the paging request is not rejected, selecting at the terminal a target cell from a plurality of candidate cells to which the terminal may attach, the target cell being able to handle the Circuit Switched session;
   performing a Packet Switched handover to a selected cell; and
   handling the Circuit Switched session in the selected cell.

8. The method of claim 5, further comprising:
   if the paging request is not rejected, selecting at the terminal a target cell from a plurality of candidate cells to which the terminal may attach, the target cell being able to handle the Circuit Switched session;
   attaching the terminal to the selected cell; and
   handling the Circuit Switched session in a selected cell.

9. The method of claim 1, wherein the one or more ongoing Packet Switched sessions are a Long Term Evolution Packet Switched session.

10. The method of claim 1, wherein the one or more ongoing Packet Switched sessions are a Universal Mobile Telecommunications System (UMTS) or High-Speed Packet Access (HSPA) Packet Switched session or a General Packet Radio Service (GPRS) Packet Switched session.

11. The method of claim 1, wherein, if the one or more ongoing Packet Switched sessions have a lower priority than the Circuit Switched session, a positive page response is sent from the terminal.

12. The method of claim 1, wherein the determining the priority of the one or more ongoing Packet Switched sessions includes comparing the one of more ongoing Packet Switched sessions with preconfigured information identifying the one or more ongoing Packet Switched sessions deemed to have a higher priority than the Circuit Switched session.

13. The method of claim 12, wherein the preconfigured information is provided by the user of the terminal.

14. The method of claim 1, wherein the determining the priority of the one or more ongoing Packet Switched sessions includes examining a Packet Data Protocol (PDP) context for a priority class identifying whether the one or more ongoing Packet Switched sessions have a higher priority than the Circuit Switched session.

15. The method of claim 1, wherein the identifying to the user that the paging request has been received includes identifying a type of Circuit Switched session requested.

16. The method of claim 1, wherein a predetermined action is taken by the terminal if no indication is received from the user within a predetermined time.

17. The method of claim 1, wherein the radio access network is handled by a Mobile Switching Centre or by a Serving GPRS Support Node (SGSN) in a Global System for Mobile Communications network or Wideband Code Division Multiple Access network that sent the paging request to establish the Circuit Switched session with the terminal.

18. A terminal for use in a Long Term Evolution radio access network, 3GPP System Architecture Evolution or Evolved Packet Core network, the terminal comprising:

a receiver for receiving a paging request to establish a Circuit Switched session with the terminal, the paging request including an indication of an originator of the Circuit Switched session that caused the paging request;

a processor for determining, if the terminal has one or more ongoing Packet Switched sessions, whether any of the one or more ongoing Packet Switched sessions have a higher priority than the Circuit Switched session by identifying to a user of the terminal that the paging request has been received and the originator of the Circuit Switched session that caused the paging request, and enabling the user to indicate whether the one or more ongoing Packet Switched sessions have a higher priority than the Circuit Switched session; and means for accepting the paging request if none of the one or more ongoing Packet Switched sessions have a higher priority than the Circuit Switched session and rejecting the paging request if at least one of the one or more ongoing Packet Switched sessions have a higher priority than the Circuit Switched session.

19. The terminal of claim 18 wherein the means for accepting and rejecting the paging request rejects the paging request by sending a negative paging response message to the originator of the Circuit Switched session.

20. The terminal of claim 18 wherein the paging request includes a type of Circuit Switched session requested.

* * * * *